United States Patent [19]

Williams

[11] 4,370,996

[45] Feb. 1, 1983

[54] FLOW-CONTROLLED INJECTOR SYSTEM

[76] Inventor: James F. Williams, 25217 Rye Canyon Rd., Valencia, Calif. 91355

[21] Appl. No.: 243,371

[22] Filed: Mar. 13, 1981

[51] Int. Cl.³ .............................................. G05D 11/00
[52] U.S. Cl. ......................................... 137/99; 222/57
[58] Field of Search ............................. 137/99; 222/57

[56] References Cited

U.S. PATENT DOCUMENTS

| | | | |
|---|---|---|---|
| 2,527,136 | 10/1950 | Kagi et al. | 222/57 |
| 2,638,247 | 5/1953 | Taylor | 222/57 |
| 3,283,957 | 11/1966 | Henderson | 222/57 |
| 3,387,563 | 6/1968 | Williams | 92/152 |
| 3,549,048 | 12/1970 | Goodman | 137/99 |
| 3,882,882 | 5/1975 | Preisig | 137/99 |
| 4,141,467 | 2/1979 | Augustijn | 137/99 |

Primary Examiner—H. Jay Spiegel
Attorney, Agent, or Firm—Lyon & Lyon

[57] ABSTRACT

A chemical injection system for automatically injecting chemicals into a fluid process line in direct proportion to the fluid flow. A fluid flow meter in the line operates a cam which in turn operates an air valve for pneumatically actuating a controller by air pulses. The controller in turn supplies pressurized air to an injector pump to operate the pump in cycles corresponding to the air pulses. By manipulating valves the controller can be changed from operating in response to the fluid-flow related air pulses regulated by the meter to a self-contained adjustable speed of operation and such valves may be remotely controlled.

11 Claims, 2 Drawing Figures

FLOW-CONTROLLED INJECTOR SYSTEM

This invention relates to a system for automatically injecting chemicals into a stream of fluid such as in a pipeline and, in particular, relates to such a system that will inject the desired amount of chemical in direct proportion to the fluid flow. Chemical injectors are used in a variety of industries for injecting relatively minute quantities of a chemical into a fluid flow line such as, for example, odorants into a natural gas line, chlorine into a waterline, corrosion or scale inhibitors into petrochemical lines, and coloring into food processing or other product lines. Most such chemical injectors are manually adjustable and their rate of flow is adjusted to the desired proportion based on the anticipated or average rate of flow in the line without attempting to accomodate fluctuations in rate of flow.

Often a chemical injector must be installed on a pipeline at a remote or difficult to reach location whereby manual adjustments are inconvenient and malfunctions are difficult to correct. The fluid in a process line may be monitored periodically or continuously to insure the appropriate quantity of chemical is being injected and yet when a malfunction causes improper injection it is difficult to quickly correct the rate of injection while the fluid continues to flow.

By this invention, a chemical injection system is provided which will automatically inject the chemical into a gas or liquid flow line in direct proportion to the rate of flow and automatically accommodate changes in the rate of flow. Further, this invention permits remote control of the chemical injection controller to change the mode of operation to a predetermined injection rate upon an interruption or malfunction in the chemical injection proportional to fluid flow operation.

Another object of this invention is to provide a chemical injection system which employs a conventional fluid flow meter to produce a periodic signal or actuation which in turn is used to periodically operate the controller for an injector pump to produce the desired rate of injection proportional to the actual fluid flow measured by the meter. A still further object of this invention is to provide such a system which may be entirely pneumatically controlled and operated to avoid the need for any electrical or hydraulic components or controls.

Other objects and advantages of this invention will appear from the following specification and the accompanying drawings.

Figure 1:
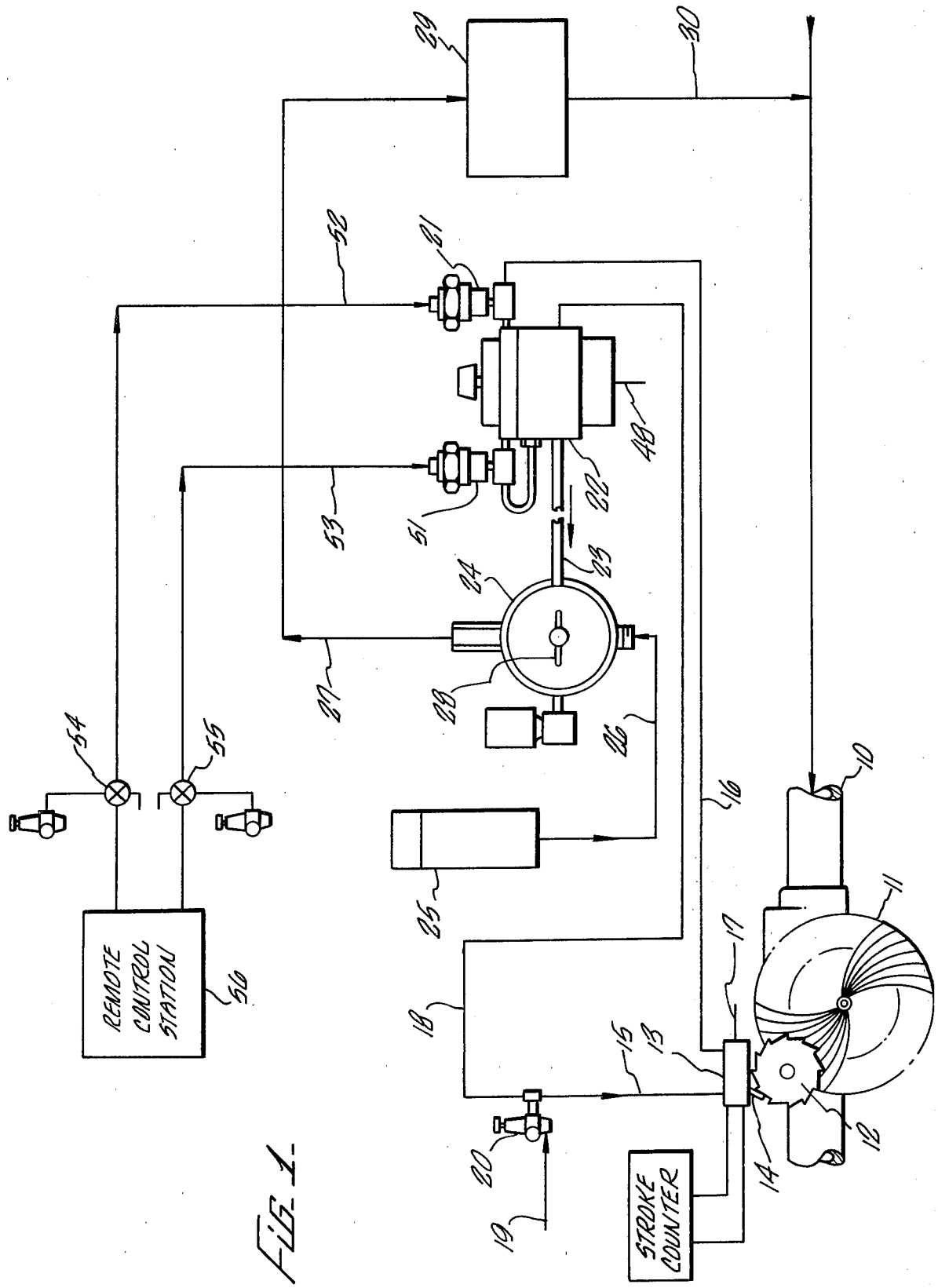
FIG. 1 is a schematic illustration of the chemical injection system of this invention.

Referring now to FIG. 1, the process line 10 through which the fluid, either gas or liquid, flows into which the chemical is to be injected in a controlled manner is provided with a conventional meter 11 which operates in direct response to the rate of flow through the line 10. The meter 11 may be of any conventional type and for convenience a turbine-type meter is diagrammatically illustrated. A rotatable cam 12 is operatively connected to the meter 11 to rotate at a rate of speed proportional to the rate of flow as measured by the meter. Normally there is an existing shaft in a conventional meter to which the cam 12 or appropriate gearing may be attached for rotating the cam.

A pneumatic valve 13 has an operating lever 14 or other convenient means associated with the cam 12 for operating the valve 13 between two positions, namely, to connect a supply of pressurized air from line 15 to line 16 or to connect line 16 to vent 17 while shutting off the supply of pressurized air from line 15. The pressurized air or any other convenient gas is supplied to line 15 and to a line 18 from a source line 19 through a conventional pressure regulator 20. Upon the appropriate amount of rotation of cam 12 the valve 13 will be operated through a single cycle by the lever 14 to first pressurize the line 16 and then vent the line 16 to 17. The cam 12 may be replaced by other cams having different numbers of lobes or teeth to increase/or decrease the number of cycles by valve 13 in proportion to the rate of flow measured by meter 11.

The line 16 is connected through a pneumatically operated valve 21 which is normally open to the controller 22. As will appear more fully hereinafter in connection with the description of FIG. 2, the controller 22 serves to provide a controlled pulse of pressurized air from line 18 through line 23 to a conventional injector pump 24 in response to each cycle by valve 13 by reason of the pulse of pressurized air supplied through line 16 and valve 21 to cause the controller 22 to operate through a single cycle. The chemical to be injected in the process line 10 is supplied from a reservoir 25 through a line 26 to pump 24. The pump 24 is preferably of the type that pumps a precise, predetermined amount of chemical for each stroke such as that shown and described in U.S. Pat. No. 3,387,563 Chemical Injector and the commercial embodiment known as the Oscillamatic Chemical Injector Pump (Oscillamatic is a registered trademark of Williams Instrument Company, Inc.). The stroke of the pump 24 may be adjusted by lever 28 to select the appropriate quantity of chemical to be injected for each cycle of the pump. The chemical is supplied from pump 24 through line 27 to conventional metering and averaging equipment, diagrammatically illustrated as 29, and then through line 30 to the process line 10. The equipment 29 includes a conventional averaging chamber, check valves, hand valves, sight glasses etc. (not shown) for metering the flow of chemical continuously into the process line 10 and to permit monitoring the proper operation but such equipment forms no part of the present invention.

Figure 2:
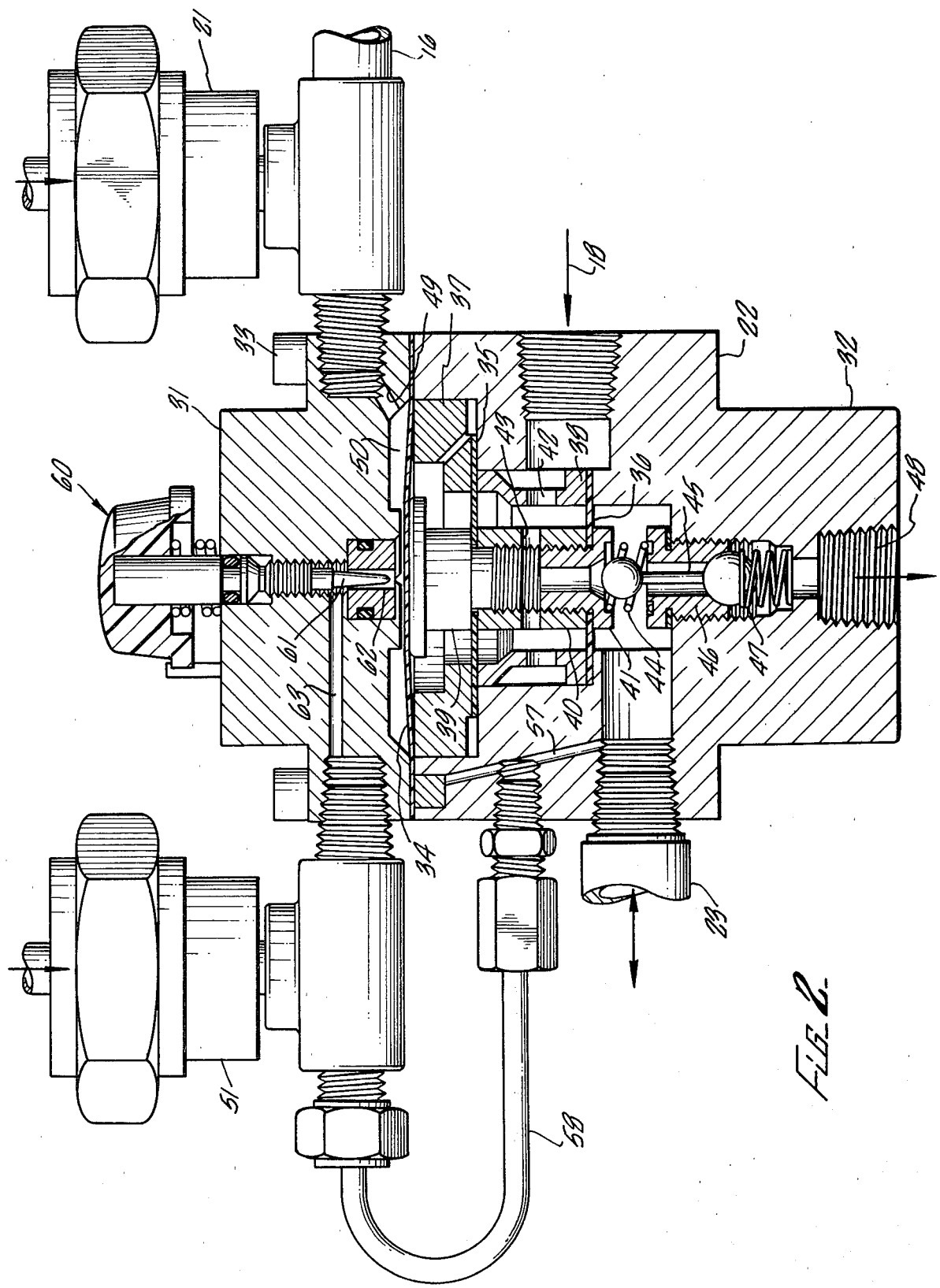
FIG. 2 is an enlarged sectional elevation of the controller employed in the system of this invention.

Referring now to FIG. 2, the operation of the controller 22 to cause the controlled operation of pump 24 in response to the pulse of pressurized air supplied from valve 13 will now be described more fully. Controller 22 is similar to but modified from the concept and construction of the controller described and illustrated in the aforementioned U.S. Pat. No. 3,387,563 Chemical Injector. The controller 22 includes an upper body 31 and a lower body 32 joined by cap screws 33. The internal cavity of the controller is provided with an upper diaphragm 34, a smaller snapper diaphragm 35 and an even smaller lower diaphragm 36. The upper diaphragm 34 is held in position between the upper and lower bodies 31 and 32. The snapper diaphragm 35 is held in position by upper spool 37 and the lower diaphragm 36 is held in position by lower spool 38. A central valve member comprising a diaphragm engaging element 39, a spacer-connector 40 and a valve seat element 41 are connected to and supported by the middle and lower diaphragms 35 and 36. The spool 38 has ports 42 for communicating the pressurized air from line 18 to the cavity between diaphragms 35 and 36.

Similarly, the spacer 40 has ports 43 for communicating that air pressure to the center bore of valve seat 41. Diaphragm 35 has a larger exposed area than diaphragm 36 and therefore the air pressure tends to urge the central valve member upwardly. Similarly a coil spring 44 engaging the bottom of valve seat 41 urges the central valve member upwardly. A pilot plug 45 comprising two balls connected by a stem is centrally positioned below the valve seat 41 with the lower ball being urged into engagement with a valve seat 46 by a coil spring 47 to seal off the exhaust port 48.

In the condition or position of controller 22 as shown in FIG. 2, the upper ball of pilot plug 45 does not engage valve seat 41 whereby there is communication of pressurized air from inlet line 18 to the outlet pressure line 23 and to pump 24 to cause a stroke of the pump. When a pulse of air pressure is conveyed through line 16 from valve 13, as described above, the pressurized air passes through port 49 to the cavity 50 above the upper diaphragm 34 urging the diaphragm and the central valve member downwardly for the valve seat 41 to engage the upper ball of pilot plug 45 and stop the supply of pressurized air from line 18 to the pump 24. Further downward movement of the central valve member and pilot plug 45 will unseat the lower ball from valve seat 46 to allow the pressurized air to escape through vent 48 from line 23 and pump 24. This permits the spring-loaded return stroke of the pump to intake a new change of the chemical from line 26. Upon venting of line 16 through valve 13 by the further movement of cam 12 to complete a full cycle, the air pressure drops in cavity 50 allowing the diaphragms and central valve member to move upwardly to the position shown in FIG. 2 again communicating the air pressure from line 18 through the center of the valve seat 41 to line 23 to cause another power stroke of pump 24. In this manner the controller 22 causes a complete, controlled stroke of pump 24 for each pulse of pressurized air supplied through line 16 from valve 13 as a result of movement of the cam 12 in response to fluid flow in line 10. The rapidity of the cycling of valve 13, controller 22 and pump 24 may be varied by changing the cam 12. The quantity of chemical injected by each cycle by pump 24 may be adjusted by the stroke adjustment handle 28. In this manner the precise amount of chemical injected in the fluid is controllable and predetermined with the rate of injection automatically tracking the rate of fluid flow measured by the meter 11 without any further adjustments or attention by the operator.

Throughout the aforedescribed operation of the chemical injection system of this invention and particularly the operation of controller 22, the pneumatically controlled valve 21 is open and a similar pneumatically controlled valve 51 on the opposite side of controller 22 is closed. Valves 21 and 51 have pneumatic lines 52 and 53, respectively, extending to valves 54 and 55 respectively at a remote control station 56. In the event there is malfunction such as in the valve 13, lever 14, cam 12 or meter 11 or even if it is desired that the meter 11 be temporarily removed from service, whereby pulses of air pressure are no longer supplied to controller 22 to cause the controller to operate pump 24, valve 21 may be closed and valve 51 opened to cause an automatic operation of the controller 22 which is no longer responsive to the actual fluid flow in line 10. This alternate or backup mode of operation of controller 22 is similar to that of conventional Oscillamatic controllers of the Williams Instrument Company, Inc. and as shown and described in the aforesaid U.S. Pat. No. 3,387,563. In this back-up mode of operation and in the condition shown in FIG. 2, the continuous air pressure from line 18 is again communicated through the central valve to line 23 for the power stroke of pump 24 and also through port 57 to line 58 through the now-open valve 51 to the upper body 31 of the controller 22. The upper body includes an adjustable needle valve, generally designated 60 having a needle-shaped stem 61 positioned in an orifice 62 to control the rate of air flow to and from passage 63 and cavity 50. As cavity 50 is pressurized by air flowing through port 57, line 58, valve 51, passage 63 and orifice 62, the upper diaphragm 34 is urged downwardly moving the central valve member downwardly to cause the aforedescribed cycle of the upper ball of pilot plug 45 seating in the valve seat 41 and the lower ball unseating to vent the pressurized air in pump 24 and line 23 and out the vent opening 48. This also vents the pressure in upper cavity 50 in a controlled manner through the adjustable needle valve 60, passage 63, valve 51, line 58, port 57 and out the vent 48 thereby allowing the central valve element to return upwardly as urged by the coil spring 44 and the air pressure on the underside of diaphragm 35 whereupon the pressurized air again passes through the center of the controller to line 23 to operate the power stroke of pump 24. This completes one pumping cycle and the rapidity of the cycle is controlled by the needle valve 60 controlling the speed with which the air passes to and from cavity 50. By adjusting the needle valve 60 to allow the air to pass therethrough rapidly, the controller 22 will cycle rapidly thereby injecting more chemical into the process line 10 for a given time period. Conversely, by adjusting the needle stem 61 downwardly to reduce the rate of flow there passed, the controller 22 will cycle more slowly to inject a smaller quantity of chemical into the process line 10 over the same period of time.

In the event remote control operation of the controller 22 between its alternate modes of operation is not desired or required, the pneumatic valves 21 and 51 may be replaced by manual valves that may be alternately opened and closed to provide the two modes of operation. Similarly, in the event pneumatic control is unavailable or undesired for any reason, the valves 21 and 51 may be replaced by electrically operated solenoid valves for accomplishing the same remote control operation. Also, the cycling air valve 13 may be controlled by any convenient means other than the cam 12 and lever 14, even by remote operation, such as an electrically operated solenoid responsive to electrical controls associated with the meter 11.

The chemical injection system of this invention as described above and illustrated in the drawings provides precise injection of the desired proportion of chemical over a full range of process fluid flow rates and does so automatically without operator adjustments or attention. By the controller serving as a "relay" to respond to the air pulse supplied by the control valve 13 to separately supply a controlled cycle of the pressurized air for operating the injector pump the operation is more consistent and reliable than previous systems simply employing the air pulse from a cycling valve to attempt to operate the injector pump. Moreover, this arrangement provides a standby mode of operation in the event of malfunctions or servicing in the meter or valve arrangement by simply changing two valves to cause the controller 22 to operate in a self-controlled cycling manner. While this invention has been described in connection with a specific embodiment and elements as illustrated in the drawings, it is to be understood that the invention is not limited to that embodiment or those elements but rather is of the full scope of the appended claims.

It is claimed:

1. In a chemical injection system for use on fluid pipeline comprising, a meter measuring fluid flow through the pipeline, an air-operated injection pump means for connecting to the pipeline for injecting predetermined amounts of chemicals into the pipeline upon each stroke, a supply of pressurized air, a controller means operatively connected to said pump means, a valve means associated with said meter for supplying first pulses of pressurized air to the controller means proportional in rapidity to the fluid flow measured by the meter, and the controller means supplying separate and controlled second pulses of pressurized air to the pump means in response to and in sequence with the first air pulses from the valve means for operating the pump means in like sequence and further in which said controller includes an adjustable control valve and port means to permit said controller to cycle automatically at adjustable rates and second valve means for selectively isolating said adjustable control valve and operating the controller by air pulses from said meter-associated valve means or isolating said meter-associated valve means and operating the controller by said adjustable control valve and port means.

2. The system of claim 1 in which said second valve means are provided with means for remotely controlling same for permitting remote selection of automatic or flow-controlled operation of said controller.

3. The system of claim 1 in which the meter is a turbine type meter, a cam is operatively connected to the turbine of said meter to rotate in direct proportion thereto, the cam is provided with at least one lobe, and means engage said cam to operate said valve means through one cycle to produce one said first air pulse in response to each lobe.

4. In a chemical injection system for use on pipeline having a meter measuring fluid flow through the pipeline, comprising, an air-operated injection pump means connected to the pipeline for injecting predetermined amounts of chemicals into the pipeline upon each stroke, a supply of pressurized air, a controller means operatively connected to said pump means, a valve means associated with the meter for supplying first pulses of pressurized air to the controller means proportional in rapidity to the fluid flow measured by the meter, and the controller means supplying separate and controlled second pulses of pressurized air to the pump means in response to and in sequence with the first air pulses from the valve means for operating the pump means in like sequence and further in which said controller includes an adjustable control valve and port means to permit said controller to cycle automatically at adjustable rates and second valve means for selectively isolating said adjustable control valve and operating the controller by air pulses from said meter-associated valve means or isolating said meter-associated valve means and operating the controller by said adjustable control valve and port means.

5. In a chemical injection system for use on a pipeline having a meter measuring fluid flow through the pipeline, an air operated injection pump means for measured and controlled injection of chemicals in the pipeline, and a supply of pressurized air, the improvement comprising, a controller means connected to the supply of pressurized air for supplying controlled pulses of pressurized air to the pump means for operating the pump means, an air valve means connected to the supply of pressurized air for supplying separate pulses of pressurized air to the controller means for operating the controller means, and means operatively connecting said air valve means and the meter for cycling said valve means between positions supplying and not supplying pressurized air to said controller means in response to the fluid flow measured by the meter and further in which said controller includes an adjustable control valve and port means to permit said controller to cycle automatically at adjustable rates and second valve means for selectively isolating said adjustable control valve and operating the controller by air pulses from said meter-associated valve means or isolating said meter-associated valve means and operating the controller by said adjustable control valve and port means.

6. The system of claim 5 in which said second valve means are provided with means for remotely controlling same for permitting remote selection of automatic or flow-controlled operation of said controller.

7. The system of claim 5 in which the meter is a turbine type meter, a cam is operatively connected to the turbine of said meter to rotate in direct proportion thereto, the cam is provided with at least one lobe, and means engage said cam to operate said valve means through one cycle to produce one air pulse in response to each lobe.

8. In a chemical injection system for use on a pipeline having a meter measuring fluid flow through the pipeline, an air operated injection pump means for measured and controlled injection of chemicals in the pipeline, and a supply of pressurized air, the improvement comprising, a controller means connected to the supply of pressurized air for supplying pulses of pressurized air to the pump means for operating the pump means, a movable valve member in said controller for causing one said air pulse in response to one cycle of movement thereof, an air valve means connected to the supply of pressurized air for supplying separate pulses of pressurized air to the controller means for causing said cyclic movement of said valve member for operating the controller means to produce said first air pulses, and means operatively connecting said air valve means and the meter for cycling said valve means between positions supplying and venting the pressurized air to said controller means in direct relationship to the fluid flow measured by the meter and further in which said controller includes an adjustable control valve and port means to permit said controller to cycle automatically at adjustable rates and second valve means for selectively isolating said adjustable control valve and operating the controller by air pulses from said air valve means or isolating said air valve means and operating the controller by said adjustable control valve and port means.

9. The system of claim 8 wherein said selectively operable means are remotely controllable.

10. In a chemical injection system for use on fluid pipeline comprising, a meter measuring fluid flow through the pipeline, an air-operated injection pump means for connecting to the pipeline for injecting predetermined amounts of chemicals into the pipeline upon each stroke, a supply of pressurized air, a controller means operatively connected to said pump means, a valve means associated with said meter for supplying first pulses of pressurized air to the controller means proportional in rapidity to the fluid flow measured by the meter, and the controller means supplying separate and controlled second pulses of pressurized air to the pump means in response to and in sequence with the first air pulses from the valve means for operating the pump means in like sequence and further in which said controller includes a diaphragm adjacent a cavity which flexes upon pressurizing said cavity which flexes upon pressurizing said cavity to cause the controller to cycle for supplying said separate and controlled second pulse of air to said pump, a port connecting said valve means directly to said cavity for communicating said first air pulses directly thereto, adjustable valve and port means for connecting the second air pulse to said cavity for causing automatic cycling, and valve means for selectively and alternately connecting the cavity to air supplied from the first said valve means or from the adjustable valve means.

11. In a chemical injection system for use on a pipeline having a meter measuring fluid flow through the pipeline, an air operated injection pump means for measured and controlled injection of chemicals in the pipeline, and a supply of pressurized air, the improvement comprising, a controller means connected to the supply of pressurized air for supplying controlled pulses of pressurized air to the pump means for operating the pump means, and air valve means connected to the supply of pressurized air for supplying separate pulses of pressurized air air to the controller means for operating the controller means, and means operatively connecting said air valve means and the meter for cycling said valve means between positions supplying and not supplying pressurized air to said control means in response to the fluid flow measured by the meter and further in which said controller includes a diaphragm adjacent a cavity which flexes upon pressurizing said cavity to cause the controller to cycle for supplying said separate and controlled pulse of air to said pump, a port connecting said valve means to said cavity for communicating said air pulses from the valve means directly to the cavity, adjustable valve and port means for communicating a portion of the controlled air pulse from the controller to the pump also to said cavity for causing automatic cycling, and valve means for selectively and alternately connecting the cavity to air supplied from the first said valve means or from the adjustable valve means.

* * * * *